Aug. 13, 1940.    W. W. MASON    2,211,281
HATCH OPERATED PRESSURE CONTROL FOR VESSELS
Filed Sept. 23, 1937    2 Sheets-Sheet 1

INVENTOR
Walden W. Mason.
BY
ATTORNEY

Aug. 13, 1940.  W. W. MASON  2,211,281
HATCH OPERATED PRESSURE CONTROL FOR VESSELS
Filed Sept. 23, 1937  2 Sheets-Sheet 2

INVENTOR
Walder W. Mason.
BY
ATTORNEY

Patented Aug. 13, 1940

2,211,281

UNITED STATES PATENT OFFICE 2,211,281

HATCH OPERATED PRESSURE CONTROL FOR VESSELS

Walden W. Mason, Kansas City, Mo.

Application September 23, 1937, Serial No. 165,325

6 Claims. (Cl. 220—85)

This invention relates to vessels for storing volatile fluids, and more particularly to a hatch operated pressure control therefor. In vessels of this character the volatile fluids are usually contained under a slight pressure differential relatively to the external pressure to prevent breaking out of the light volatile fractions. In many installations the vessels are arranged in batteries and are connected by a common header through which pressures produced by the volatile fluids are equalized and kept under control by a back pressure valve that is connected with the outlet end of the header. When it becomes necessary to open a hatch for any one of the vessels, as when gauging or checking the quantity of fluid, pressure escapes from all of the vessels through the opened hatch by way of the equalizing header.

It is, therefore, a principal object of the present invention to provide the hatch of each vessel with means for automatically isolating any one of the vessels whenever the hatch for that vessel is to be opened.

Other important objects of the invention are to provide a hatch with a connection for the equalizing header which is equipped with a check means tripped incidental to actuation of an initial pressure release prior to opening of the hatch; and to provide for resetting of the check means incidental to closure of the hatch.

In accomplishing these and other objects of the invention, as hereinafter pointed out, I have provided improved details of structure, the preferred form of which is illustrated in the accompanying drawings, wherein.

Figure 1:
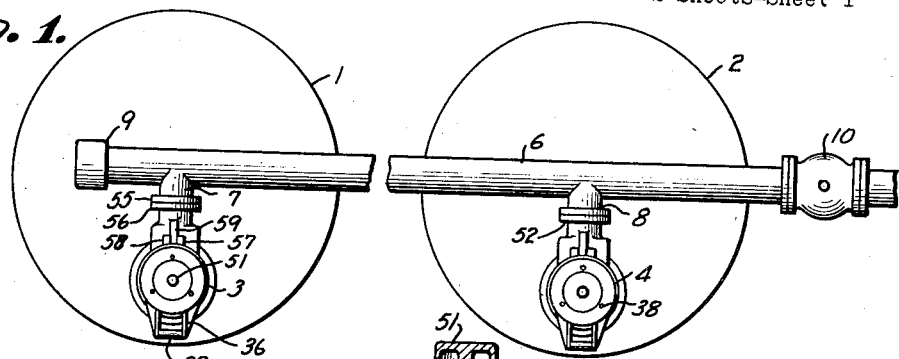
Fig. 1 is a plan view of a battery of vessels, such as ordinary liquid hydrocarbon storage tanks, that are connected by a common equalizing header wherein the pressure in all of the tanks is equalized under control of a pressure regulating valve, the vessels being equipped with hatches and hatch operated pressure control mechanisms embodying the features of the present invention.

Referring more in detail to the drawings:

1 and 2 designate tanks or vessels for containing volatile fluids, such as oil and similar hydrocarbons, under slight pressure differential to prevent breaking out of the lighter volatile fractions. The tanks 1 and 2 are provided with hatches 3 and 4 that are mounted upon the roofs 5 of the respective tanks, and through which the contents of the tanks are gauged or sampled as in conventional practice. The tanks are usually arranged in batteries and connected by a common equalizing header 6 having lateral branches 7 and 8 which communicate with the respective tanks by way of the hatches 3 and 4. One end of the equalizing header 6 is closed by a cap 9 and the other end is provided with a back pressure control valve 10 that may be set to maintain a predetermined equalized pressure differential in all of the respective tanks, the pressure being generated by reason of the volatile characteristics of the contained fluids.

Figure 2:
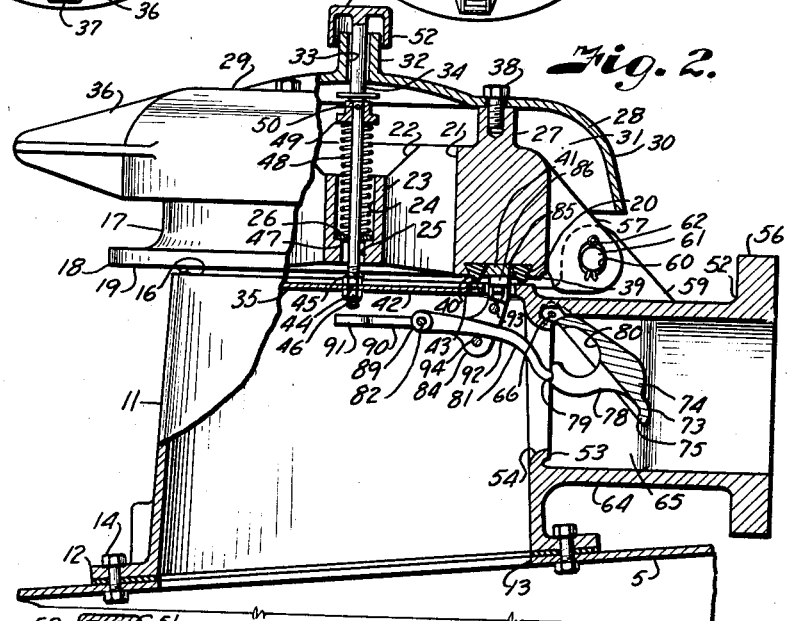
Fig. 2 is a detail view of one of the hatches partly in side elevation and partly in longitudinal section to illustrate the check means in the header connection and the operating mechanism therefor, the check means being shown in open position.

The hatches 3 and 4 are of identically the same construction and illustrated in detail in Figs. 2 to 6 inclusive. As shown in Fig. 2, the hatch includes a collar 11 having a base flange 12 for attachment over the gauge hole openings 13, that are formed in the roofs 5 of the tanks, by fastening devices such as bolts or the like 14. The upper end of the collar 11 terminates in an annular, inwardly extending rim or flange 15 forming a seat 16 for the hatch cover 17. The cover 17 includes a disk-shaped body 18 of slightly larger diameter than that of the seat and has a flat, lower face 19 provided with an annular dovetail groove 20, the outer edge of which substantially registers with the periphery of the rim 15.

Figure 3:
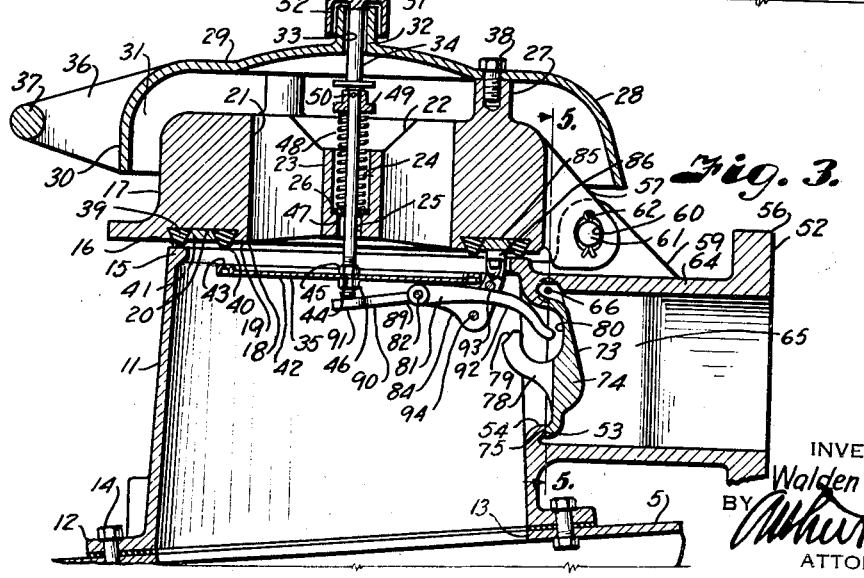
Fig. 3 is a longitudinal section through the hatch showing the initial pressure release valve in open position and having tripped the check means to prevent loss of pressure differential from the other vessels that may be connected in the battery.

Formed within the axis of the body 18 is an opening 21 through which pressure in the tank is initially released, as later described. Supported within the opening 21, by radial arms 22, is a central, sleeve-like guide 23 having upper and lower bores 24 and 25 of differential diameters to form an internal shoulder 26. Formed on the upper end of the cover body 18 are lugs 27 supporting a cap or shield 28 which includes a disk-like portion 29 seated on the lugs in spaced covering relation with the cover 21, and an outwardly and downwardly curved rim 30 extending in spaced relation with the periphery of the cover body to cooperate therewith in forming an annular, downwardly opening passageway 31, as best shown in Fig. 3. The top of the cap is provided with a central upwardly extending boss 32, having a bore 33 aligning with the bores 24 and 25 to slidably mount the stem 34 of a valve 35 as later described. The cap 28 is provided with forwardly extending arms 36 connected by a rod 37 to form a handle for manipulating the cover as later described. The cap is secured to the lugs 27 by fastening devices, such as cap screws 38, extending through suitable openings in the cap and into threaded sockets in the lugs 27, as shown in Fig. 2.

Mounted in the dovetail groove 20, and engaging the outer and inner peripheries thereof, are outer and inner gasket rings 39 and 40, which are also of dovetail cross-section and arranged with the base portions thereof seated against the bottom of the annular groove, and which are wedged thereagainst by an annular wedging ring 41 that is inserted between the gaskets so that the outer gasket is supported to sealingly engage the seat 16 and the inner gasket to sealingly engage the valve 35.

The valve 35 includes a disk-shaped head 42 having an annular seating face 43 adapted to sealingly engage with the inner gasket ring, as shown in Fig. 2, to close passage through the opening 21. The stem 34 of the valve includes a reduced shank portion extending through the bores 24 and 25, and has a threaded end extending through a central aperture 44 in the valve head to be secured thereto by nuts 45 and 46 threaded on the stem and engaging the respective sides of the valve head. Sleeved on the stem, and having one end bearing against a washer 47 that is seated on the shoulder 26, is a coil spring 48 having its upper end engaging a collar 49 fixed to the valve stem by a pin 50 so that the spring is tensioned to normally support the valve in sealing engagement with the gasket. The larger end of the stem extends upwardly through the bore 33 of the boss 32 and carries a head 51 having a depending flange 52 telescoping over the boss 32, the head being normally spaced from the upper end of the boss to provide ample opening movement of the valve as later described.

The cover thus described is hingedly connected with an equalizing header connection 52 that projects laterally from one side of the collar 11, and which has a check valve seat 53 that is formed by an inwardly and outwardly extending flange encircling a port 54 through which the interior of the collar is connected with a branch of the equalizing header by means of flanged collars 55 and 56, or other suitable connecting means. The hinge connection includes a pair of spaced lugs 57 and 58 projecting from the side of the cover body opposite to the handle and which straddle a single lug 59 projecting upwardly from the equalizing connection 52. Extending through slightly elongated openings 60 in the lugs 57 and 58, and in a registering opening in the lug 59, is a hinge pin 61 that is retained by cotter pins 62 extending through the ends thereof and engaging washers 63 bearing against the outer sides of the lugs 57 and 58. The connection 52 includes a substantially rectangular cross-section 64 on the outlet side of the valve seat 53 to provide a check valve chamber 65. Carried in the plane of the seat 53, and extending across the valve chamber above the port 54, is a rod 66 having its ends mounted in bushings 67 and 68 pressed into openings 69 and 70 formed in the side walls of the valve chamber. Hingedly supported on the rod 66, by means of arms 71 and 72, is a check valve 73 having a weighted body 74 and an annular seat engaging face 75 to sealingly contact with the seat 53 when the valve is closed as shown in Fig. 3. The check chamber is provided with upwardly extending bosses 76 and 77, aligning with the attaching points of the arms 71 and 72 to provide ample clearance therefor and free movement of the valve to and from engagement with its seat. The check valve also includes an upwardly curved lug 78 that projects through the port 54, and has a lever engaging seat 79 on the terminal end thereof.

Figure 4:
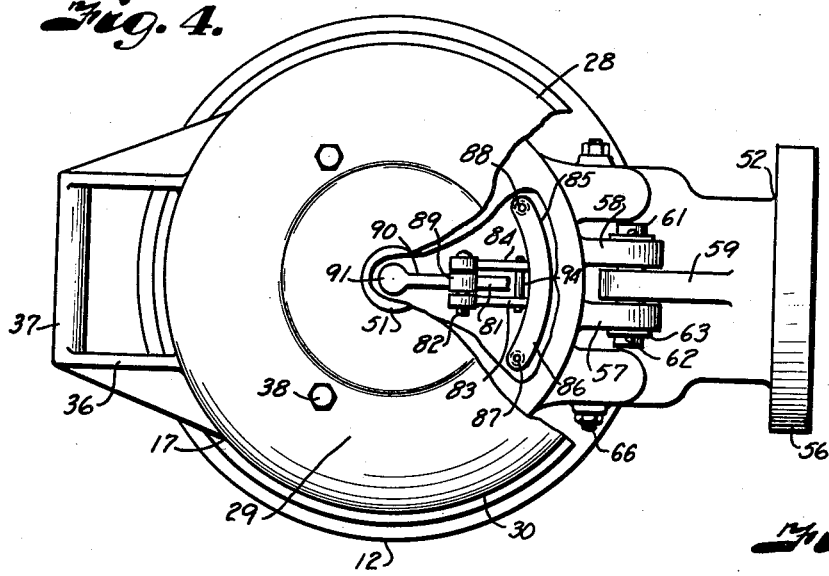
Fig. 4 is a plan view of the hatch, a part of the cover being broken away to better illustrate the check trip and opening mechanism.
Figure 5:
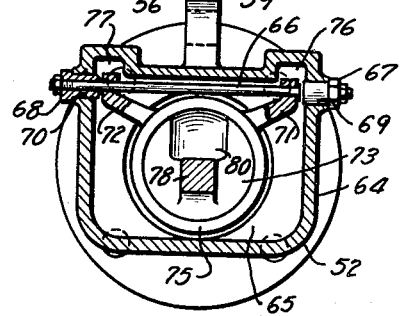
Fig. 5 is a cross-section through the equalizing header connection on the line 5—5 of Fig. 3.

Formed in the valve, above the lug 78, is a recess 80 to freely receive an actuating lever 81 when the valve is closed. The trip lever 81 is pivotally mounted on a cross pin 82 that is carried between a pair of downwardly and inwardly extending arms 83 and 84 of a bracket 85, having a substantially arcuate attaching flange 86 which is secured to the wedging ring 41, previously described, by fastening devices 87 and 88, as best shown in Fig. 4. The trip lever includes a hub portion 89 having a forwardly extending arm 90 terminating in a head 91 adapted to engage under the terminal end of the valve stem 34, and an oppositely directed arm curved downwardly and outwardly in the direction of the lug 78 to terminate in a finger 92 that is adapted to engage the seat 79 of the lug to move and latch the check valve in open position, as later described. Swinging movement of the trip lever is limited by means of pins 93 and 94 extending through the arms of the supporting bracket on opposite sides of the lever, as shown in Fig. 2, so that the lever is always supported for engagement with the seat 79, or to enter the recess 80 when the check valve is tripped.

Figure 6:
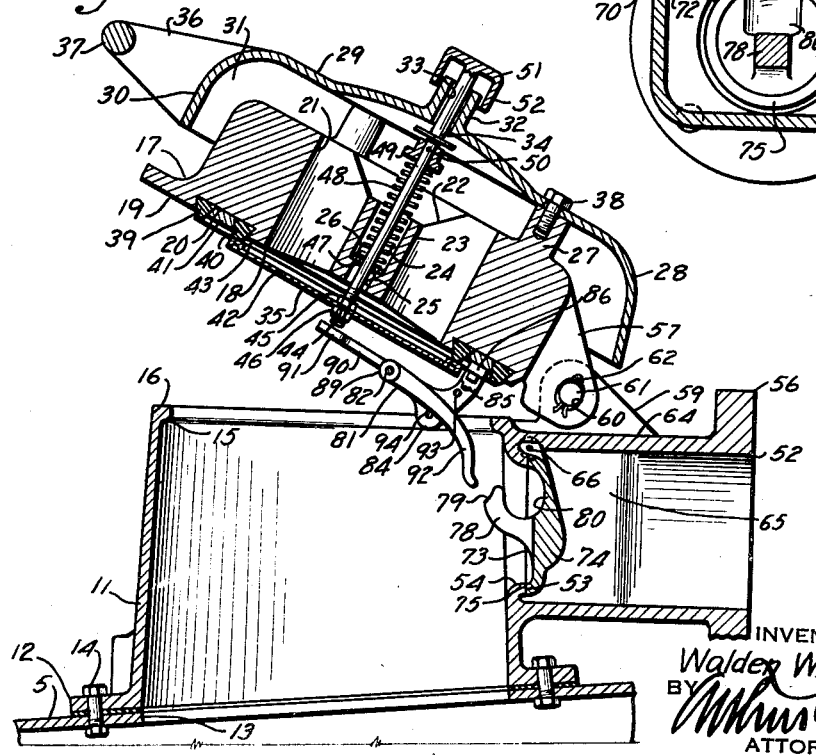
Fig. 6 is a section similar to that shown in Fig. 3, the hatch cover being moved to open position, the initial pressure release valve being closed and the trip lever re-positioned for engaging the check means to effect opening thereof when the hatch cover is closed.

In operating a hatch constructed and assembled as described, the check valve is normally retained in open position since the finger on the trip lever is latchingly engaging with the seat 79 as shown in Fig. 2. Assuming that the cover is to be raised to permit gauging of the tank or inspection of the fluid contained therein, the pressure in the tank is initially relieved by pushing downwardly on the head of the valve stem 34 to unseat the valve 35. As the valve is moved to unseated position the terminal end of the stem 34 engages the head 91 on the arm 90 of the trip lever 81 to swing the trip lever in a counterclockwise direction, Fig. 2, to displace the finger from engagement with its seat 79, allowing the check valve to swing to closed position and the finger of the trip lever to enter the recess 80, as shown in Fig. 3. As soon as the check seats, the interior of the tank carrying the hatch is isolated from the other tanks so that the equalizing pressure is maintained therein during release of pressure incidental to opening of the valve 35. Upon opening of the valve 35, the tank pressure is gradually exhausted through the opening 21, and is deflected downwardly by the cap or hood 28 so that it is directed away from the face of the operator. When the pressure has been sufficiently lowered, the valve is released and the spring returns it to seated engagement with the inner gasket ring. The cover is then swung to open position to permit the gauging operation. During this movement of the cover, the finger end 92 of the trip lever 81 rides out of the recess 80 and is carried in position to engage the seat 79 of the lug 78, as shown in Fig. 6. Then when the cover is moved to seated position the finger 81 engages the seat 79 of the lug 78 to move the check valve 73 to open position just before the cover engages its seat on the collar, thereby re-establishing communication with the other tanks through the equalizing header.

From the foregoing it is obvious that I have provided a hatch operated control whereby any tank in a battery may be isolated from the other tanks when the hatch for that tank is to be opened. Since the checking means is operated incidental to initial release of pressure from the tank, there is little or no drop in pressure in the other tanks since the check means for the hatch to be opened is closed incidental to initial movement of the pressure release means. The check therefore continues to maintain the pressure in the other tanks after the pressure has been released and the cover opened. Then when the cover is closed the trip lever automatically opens the check so that equalizing pressure is reestablished in the tank having the hatch which has been opened.

What I claim and desire to secure by Letters Patent is:

1. A hatch for a vessel containing a liquid under pressure including a collar-like body having an annular seat, a cover removably engaged with the annular seat on said collar-like body to retain pressure in the vessel, a pressure equalizing connection on the hatch, a check valve in said equalizing connection, means for manually releasing pressure through said collar-like body prior to unseating of the cover, and operating means connecting said pressure releasing means with the check valve whereby the check valve is seated to close said equalizing connection upon actuation of the pressure release means and the vessel is vented prior to unseating of the cover.

2. A hatch for a vessel containing a liquid under pressure including a collar-like body having an annular seat, a cover removably engaged with the annular seat on said collar-like body to retain pressure in the vessel and having an opening therethrough, a pressure equalizing connection on the hatch, a check valve in said equalizing connection, a valve normally closing the opening in said cover and adapted to open under predetermined differential pressure acting on the respective sides thereof, and an operating connection between said normally closed valve and the check valve, whereby the check valve is seated to close said equalizing connection upon unseating of said normally closed valve.

3. A hatch for vessels containing a liquid under pressure including a collar-like body having an annular seat, a cover removably engaged with the annular seat on said collar-like body and having an opening therethrough, a relief valve normally closing said opening and having a stem extending through said cover whereby said valve is adapted to be unseated exteriorly of the cover to vent pressure from the vessel prior to unseating of the cover, a pressure equalizing connection on the collar-like body, a check valve in said connection for closing flow therethrough, and a trip connection between said relief and check valves, whereby the check valve is tripped to closed position upon opening of the relief valve prior to unseating of the cover.

4. A hatch for vessels containing a liquid under pressure including a collar-like body, a cover removably seated on said collar-like body and having an opening therethrough, a relief valve normally closing said opening and having a stem extending through said cover whereby said valve is unseated exteriorly of the cover to vent pressure from the vessel prior to unseating of the cover, a pressure equalizing connection on the collar-like body, a check valve in said connection for closing flow therethrough, a trip lever pivotally suspended from said cover and having latch engagement with the check valve, and an arm on the trip lever extending in the path of movement of said relief valve whereby the check valve is tripped to closed position upon opening of the relief valve prior to unseating of the cover.

5. A hatch for vessels containing a liquid under pressure including a collar-like body, a cover removably seated on said collar-like body and having a flow opening therethrough, a vacuum release valve normally closing said opening, a pressure equalizing connection on the collar-like body, a check valve in said connection for closing flow therethrough, a trip lever pivotally suspended from said cover and having latch engagement with the check valve, and an arm on the trip lever extending in the path of movement of said vacuum release valve whereby the check valve is tripped to closed position upon actuation of the vacuum release valve.

6. A hatch for vessels containing liquid under pressure including a collar-like body having an annular seat, a cover removably engaged with said annular seat and having an opening therethrough, an inwardly opening valve closing said opening, a spring normally retaining the valve in closed position, a pressure equalizing connection on the hatch, a check valve for closing flow through said connection, a trip lever, means pivotally supporting the trip lever on the cover, a latch-like connection between the trip lever and the check valve, an arm connected with the trip lever and located in the path of movement of said inwardly opening valve whereby the check valve is tripped to closed position by actuation of said inwardly opening valve, and means for operating said inwardly opening valve exteriorly of the cover for tripping said check valve prior to opening of the cover.

WALDEN W. MASON.